US008931335B2

(12) United States Patent
Rabinovich et al.

(10) Patent No.: US 8,931,335 B2
(45) Date of Patent: Jan. 13, 2015

(54) PROCESSING OF MULTI-COMPONENT INDUCTION DATA IN THE PRESENCE OF BOREHOLE ABNORMALITIES

(75) Inventors: Michael B. Rabinovich, Houston, TX (US); Alexandre N. Bespalov, Spring, TX (US); Bill H. Corley, Conroe, TX (US); Tsili Wang, Katy, TX (US)

(73) Assignee: Baker Hughes Incorporation, Houston, TX (US)

( * ) Notice: Subject to any disclaimer, the term of this patent is extended or adjusted under 35 U.S.C. 154(b) by 1655 days.

(21) Appl. No.: 11/400,548

(22) Filed: Apr. 7, 2006

(65) Prior Publication Data

US 2007/0234787 A1 Oct. 11, 2007

(51) Int. Cl.
*E21B 47/12* (2012.01)
*G01V 3/28* (2006.01)

(52) U.S. Cl.
CPC ........................................ *G01V 3/28* (2013.01)
USPC ....................................................... 73/152.02

(58) Field of Classification Search
USPC ........................................ 73/152.02; 702/11
See application file for complete search history.

(56) References Cited

U.S. PATENT DOCUMENTS

| 4,302,722 | A | 11/1981 | Gianzero | 324/339 |
|---|---|---|---|---|
| 4,837,517 | A | 6/1989 | Barber | 324/339 |
| 5,157,605 | A | 10/1992 | Chandler et al. | 364/422 |
| 5,452,761 | A | 9/1995 | Beard et al. | 166/250 |
| 5,600,246 | A | 2/1997 | Forgang et al. | 324/339 |
| 5,703,286 | A * | 12/1997 | Proett et al. | 73/152.05 |
| 5,737,277 | A * | 4/1998 | Priest | 367/27 |
| 5,781,436 | A | 7/1998 | Forgang et al. | 364/422 |
| 5,884,227 | A | 3/1999 | Rabinovich et al. | 702/7 |
| 5,999,883 | A | 12/1999 | Gupta et al. | 702/7 |
| 6,470,274 | B1 | 10/2002 | Mollison et al. | 702/7 |
| 6,541,979 | B2 * | 4/2003 | Omeragic | 324/339 |
| 6,624,634 | B2 * | 9/2003 | Rosthal et al. | 324/338 |
| 6,636,045 | B2 | 10/2003 | Tabarovsky et al. | 324/343 |
| 6,643,589 | B2 | 11/2003 | Zhang et al. | 702/7 |
| 6,801,473 | B2 | 10/2004 | Matteucci et al. | 367/47 |
| 6,832,159 | B2 * | 12/2004 | Smits et al. | 702/11 |
| 6,885,947 | B2 * | 4/2005 | Xiao et al. | 702/17 |
| 6,898,967 | B2 * | 5/2005 | Macpherson | 73/152.05 |
| 7,043,370 | B2 * | 5/2006 | Yu et al. | 702/7 |
| 7,268,555 | B1 * | 9/2007 | Rabinovich et al. | 324/338 |
| 7,273,097 | B2 * | 9/2007 | Fox et al. | 166/250.02 |

(Continued)

FOREIGN PATENT DOCUMENTS

WO WO9800733 8/1998

OTHER PUBLICATIONS

M. Rabinovich et al.; *Formation Dips from Multi-Component Induction Data as an Alternative to Image Logs in Difficult Borehole Environments*; Jan. 18, 2007, Petrotech, pp. 1-6, 4 Figs.

(Continued)

*Primary Examiner* — Hezron E Williams
*Assistant Examiner* — Rodney T Frank
(74) *Attorney, Agent, or Firm* — Mossman Kumar & Tyler PC

(57) ABSTRACT

Measurements made by a multi-component induction logging tool may be corrected for tool eccentricity or the presence of a fracture in the earth formation. The corrected measurements may then be used in conjunction with a multi-array measurement to determine horizontal and vertical formation resistivity.

13 Claims, 8 Drawing Sheets

(56) References Cited

U.S. PATENT DOCUMENTS

| | | | |
|---|---|---|---|
| 7,333,891 B2 * | 2/2008 | Rabinovich et al. | 702/7 |
| 7,359,800 B2 * | 4/2008 | Rabinovich et al. | 702/7 |
| 7,379,818 B2 * | 5/2008 | Rabinovich et al. | 702/6 |
| 2002/0126576 A1 | 9/2002 | Douma et al. | 367/21 |
| 2002/0152032 A1 | 10/2002 | Bird et al. | 702/17 |
| 2003/0055569 A1 | 3/2003 | Shatilo et al. | 702/17 |
| 2003/0105592 A1 | 6/2003 | Fokkema et al. | 702/17 |
| 2004/0044480 A1 | 3/2004 | Wood | 702/17 |
| 2004/0049348 A1 | 3/2004 | Wood | 702/17 |
| 2004/0049349 A1 | 3/2004 | Wood | 702/17 |
| 2004/0220741 A1 | 11/2004 | Haugland | 702/7 |
| 2005/0001623 A1 | 1/2005 | Hanstein et al. | 324/336 |
| 2005/0030038 A1 | 2/2005 | Chen et al. | 324/343 |
| 2005/0040828 A1 | 2/2005 | Xiao | 324/339 |
| 2005/0116718 A1 * | 6/2005 | Chen et al. | 324/338 |
| 2005/0140373 A1 * | 6/2005 | Li et al. | 324/338 |
| 2005/0143920 A1 | 6/2005 | Barber et al. | 702/7 |
| 2006/0164092 A1 | 7/2006 | Forgang et al. | 324/339 |
| 2006/0192562 A1 | 8/2006 | Davydychev et al. | 324/339 |
| 2006/0208737 A1 | 9/2006 | Merchant et al. | 324/330 |
| 2007/0239360 A1 * | 10/2007 | Rabinovich et al. | 702/11 |

OTHER PUBLICATIONS

Moran et al.; *Basic Theory of Induction Logging and Application to Study of Two-Coil Sondes*, Society of Exploration Geophysicists, vol. 27, No. 6, Dec. 1962, pp. 829-858.

L. Yu et al; "The Reduction of Near Zone Effects on the Multi-component Induction Logging Tool," SPE 84097, SPE Annual Technical Conference an Exhibition, Denver, Colorado, Oct. 5-8, 2003, pp. 1-6.

* cited by examiner

PROCESSING OF MULTI-COMPONENT INDUCTION DATA IN THE PRESENCE OF BOREHOLE ABNORMALITIES

BACKGROUND OF THE INVENTION

1. Field of the Invention

The invention is related generally to the use of multi-component resistivity measurements for determination of properties of earth formations.

2. Background of the Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

Conventional induction well logging techniques employ an insulating pipe inside a coil mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In conventional induction logging apparatus, the basic transmitter coil and receiver coil has axes which are aligned with the longitudinal axis of the well logging device. (For simplicity of explanation, it will be assumed that the borehole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the bore hole, and the vertical resistivity in the direction parallel to the bore hole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722 to Gianzero et al. Transverse anisotropy often occurs such that variations in resistivity occur in the azimuthal direction.

In the transverse induction logging tools the response of transversal coil arrays is determined by an average resistivity, however, the relatively lower conductivity of hydrocarbon-bearing sand layers dominates in this estimation. In general, the volume of shale/sand in the formation can be determined from gamma-ray or nuclear well logging measurements. Then a combination of the conventional induction logging tool with transmitters and receivers oriented along the well axis and the transversal induction logging tool can be used for determining the conductivity of individual shale and sand layers.

Multi-component signals can be used for interpreting formation resistivities and petrophysical parameters. The principles used for this interpretation have been discussed, for example, in U.S. Pat. No. 6,470,274 to Mollison et al, U.S. Pat. No. 6,643,589 to Zhang et al., U.S. Pat. No. 6,636,045 to Tabarovsky et al., the contents of which are incorporated herein by reference. Specifically, the parameters estimated may include horizontal and vertical resistivities (or conductivities), relative dip angles, strike angles, sand and shale content and water saturation. In addition, U.S. patent application Ser. No. 11/125,530 of Rabinovich et al. teaches the use of multi-component measurements for analysis of fractured earth formations that may also have anisotropic layers.

Not discussed in the prior art is the effect of tool eccentricity on multi-component measurements. The present invention is directed towards the effects of tool eccentricity and expands on the effects of fractures discussed in Rabinovich.

SUMMARY OF THE INVENTION

One embodiment of the present invention is a method of evaluating an earth formation. The method includes making at least one multi-component measurement using a logging tool in a borehole in the earth formation. The multi-component measurements are indicative of a resistivity property of the earth formation and are affected by an azimuthal disturbance. The method further comprises applying a correction to the multi-component measurements that corrects for the disturbance.

Another embodiment of the invention is an apparatus for evaluating an earth formation. The apparatus includes a logging tool which is conveyed in a borehole in the earth formation. The logging tool makes one or more multi-component measurements indicative of a resistivity property of the earth formation, the measurements being affected by an azimuthal disturbance. The apparatus also includes a processor which applies a correction to the multi-component measurements.

Another embodiment of the invention is a computer-readable medium for use with an apparatus for evaluating an earth formation. The apparatus includes a logging tool conveyed in a borehole in the earth formation. The logging tool makes one or more multi-component measurements indicative of a resistivity property of the earth formation. The measurements are affected by an azimuthal disturbance. The medium includes instructions which enable a processor to apply a correction to the multi-component measurements.

BRIEF DESCRIPTION OF THE FIGURES

The present invention is best understood with reference to the following figures in which like numbers refer to like components and in which.

DETAILED DESCRIPTION OF THE INVENTION

Figure 1:
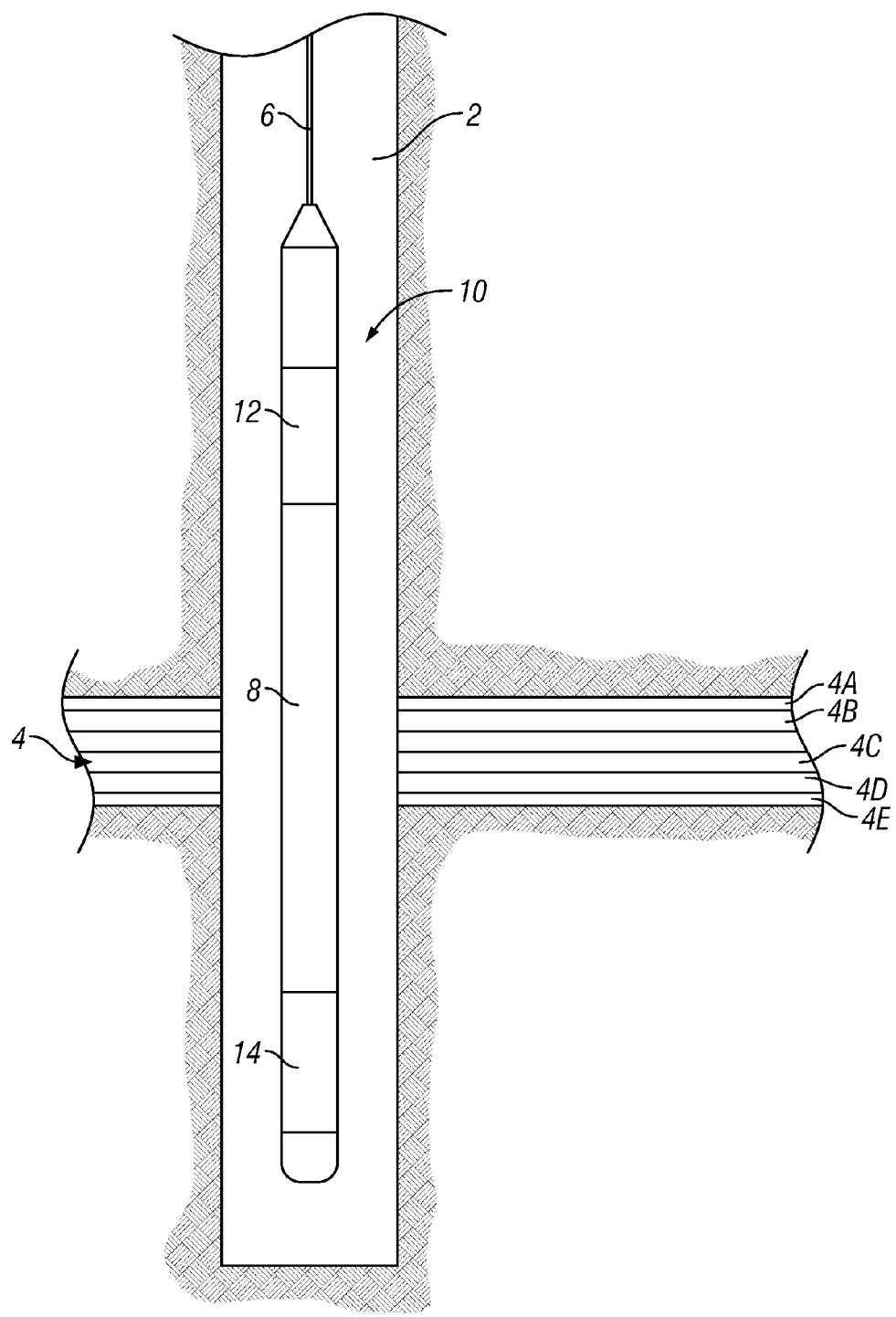
FIG. 1 illustrates an induction instrument disposed in a wellbore penetrating an earth formation.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor which controls the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
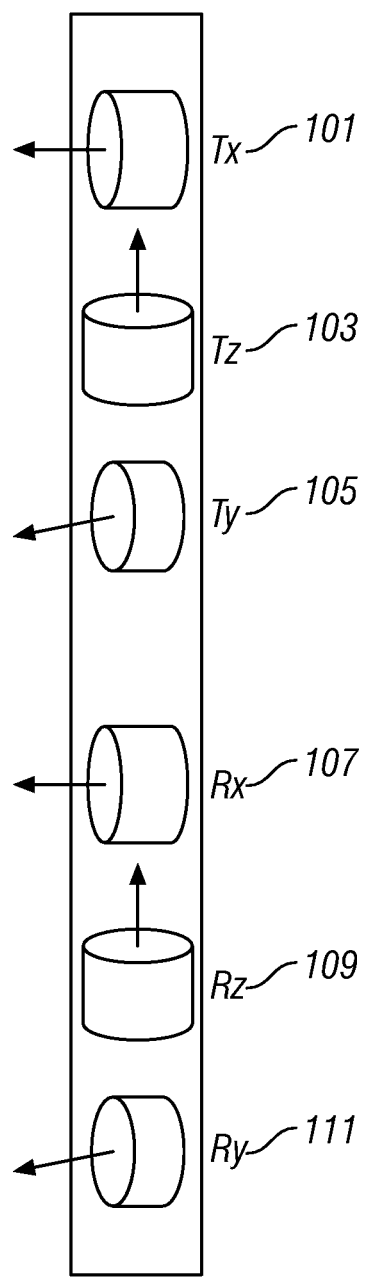
FIG. 2 (prior art) illustrates the arrangement of transmitter and receiver coils in multi-component induction logging tool marketed under the name 3DExplorer™.

Referring to FIG. 2, the configuration of transmitter and receiver coils in the 3DEX™ multi-component induction logging instrument of Baker Hughes is shown. This is for exemplary purposes only and any multi-component tool may be used. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used. It should be noted that the method of the present invention may also be used with non-orthogonal configurations of transmitters and receivers. Well known coordinate rotation methods may be used with such non-orthogonal measurements to rotate them into the desired orientation. For the purposes of the present invention, all such measurements (orthogonal and non-orthogonal) will be referred to as multi-component measurements.

Figure 3:
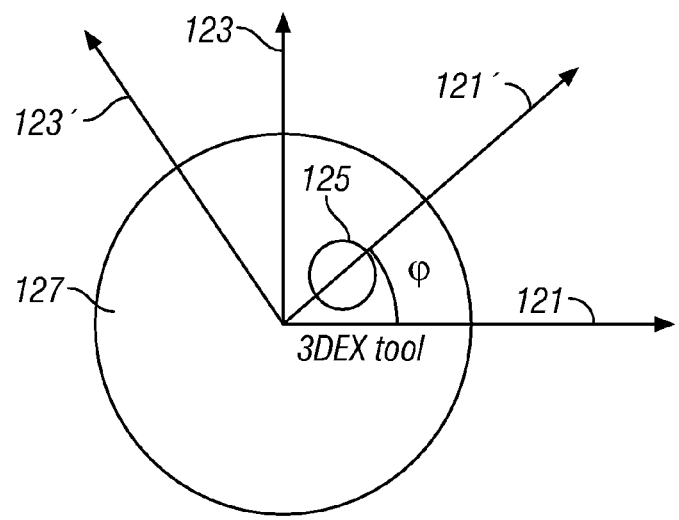
FIG. 3 illustrates an eccentered logging tool inside a borehole.

Turning now to FIG. 3, a top view of an eccentric logging tool 123 is shown within a circular borehole 127. The tool coordinate system is defined by the (x,y) axes 121, 123. The eccentricity direction is defined by the direction 121'. This defines a new coordinate system (x',y') 121', 123'. It can be shown that when a multi-component tool is oriented such that X-coils of the tool are aligned with the eccentricity direction, the $H_{x'x'}$ measurement (coils oriented with magnetic moments parallel to the eccentricity direction) is substantially unaffected by eccentricity. This is due to the fact that the currents induced by x'-transmitter flowing up and down the borehole are equal (due to symmetry) and they cancel each other out. The remaining borehole effect changes very little with eccentricity due to the large spacing between transmitter and receivers. In Table 1 we present results for the numerical eccentricity modeling of XX component in 12.25" hole with 0.05 Ω-m mud for 1.6 m main coil spacing and frequency 20 KHz:

TABLE 1

Apparent resistivities for XX component for different tool eccentricities in X-direction.

| Eccentricity | Apparent Resistivity (ohm · m) | |
|---|---|---|
| (in) | Rt = Rv = 5 Ohm · m | Rt = Rv = 25 Ohm · m |
| 0 | 7.68 | 24.4 |
| 0.5 | 7.69 | 24.5 |
| 1.0 | 7.69 | 24.5 |
| 1.5 | 7.69 | 24.6 |
| 2.0 | 7.70 | 24.7 |

In Table 1, the eccentricity is defined as the distance from the center of the borehole to the center of the logging tool.

The multi-component induction tool of FIG. 2 acquires, among other measurements, $H_{xx}$, $H_{yy}$ and $H_{xy}$ components that are oriented at unknown angle $\phi$ with respect to the eccentricity direction and corresponding coordinate system (x',y'). Below we illustrate how from measured $H_{xx}$, $H_{yy}$, and $H_{xy}$ components from an eccentered tool 124 we can determine the orientation of the eccentricity (angle $\phi$). By using a rotation technique, this makes it possible to extract the unaffected corresponding component $H_{x'x'}$. This unaffected component can then be used in subsequent processing for resistivity anisotropy.

For the eccentered tool the measured $H_{xx}$, $H_{yy}$, and $H_{xy}$ components can be expressed through the principal components $H_{x'x'}$ and $H_{y'y'}$ using the known rotation equation:

$$\begin{pmatrix} H_{xx} \\ H_{yy} \\ H_{xy} \end{pmatrix} = \begin{pmatrix} \cos^2\varphi & \sin^2\varphi \\ \sin^2\varphi & \cos^2\varphi \\ -\cos\varphi\sin\varphi & \cos\varphi\sin\varphi \end{pmatrix} \begin{pmatrix} H_{x'x'} \\ H_{y'y'} \end{pmatrix}. \quad (1)$$

This relationship allows us immediately determine the angle $\phi$:

$$\varphi = \frac{1}{2}\tan^{-1}\left(\frac{2H_{xy}}{H_{yy} - H_{xx}}\right). \quad (2)$$

Consequently, we can calculate the principal $H_{x'x'}$ component itself:

$$H_{x'x'} = \frac{H_{xx}\cos^2\varphi - H_{yy}\sin^2\varphi}{\cos^2\varphi - \sin^2\varphi}. \quad (3)$$

Those versed in the art and having the benefit of the present disclosure would recognize that given knowledge of the borehole diameter and the mud resistivity (or equivalently, the mud conductivity) the amount of eccentricity of the logging tool can be estimated. From a practical standpoint, this requires the use of a caliper such as an acoustic caliper to give measurements from which the borehole diameter can be estimated, and a mud resistivity measuring device. In one embodiment of the invention, an acoustic caliper is provided, and a mud resistivity device such as that disclosed in U.S. Pat. No. 6,801,039 to Fabris et al., (having the same assignee as the present invention and the contents of which are incorporated herein by reference) may be used.

Figure 4:
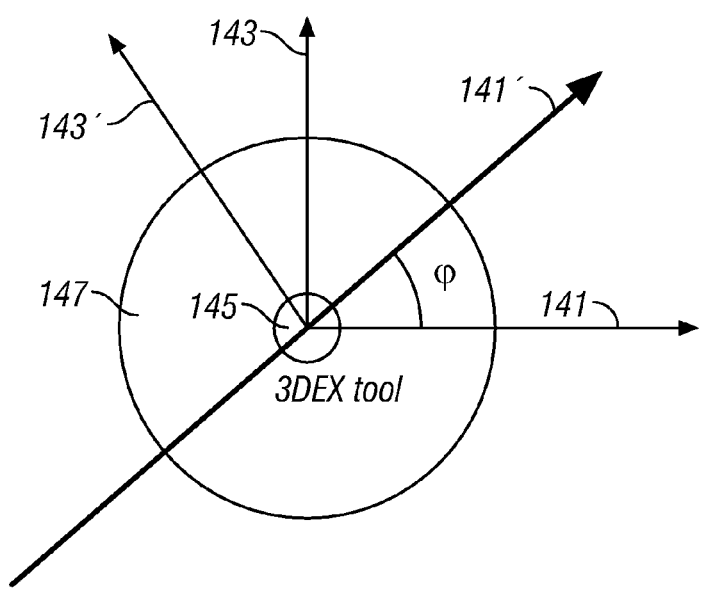
FIG. 4 illustrates a logging tool inside a borehole with a fracture direction indicated thereon.

A similar problem is encountered in the presence of fractures. As discussed in U.S. patent application Ser. No. 11/125, 530 of Rabinovich et al., resistive and conductive fractures may significantly affect the measurements of induction tools. The basic geometry is illustrated in FIG. 4 where a 3DEX tool 145 is shown in a circular borehole 147. The tool (x,y) coordinate system is indicated by 141, 143. A fracture plane is indicated by 141' and the normal to the fracture plane is 143'. We consider a rotated coordinate system defined by the directions 141', 143'.

When a multi-component tool is oriented such that X-coils of the tool are aligned with the fracture plane, the $H_{y'y'}$ measurement (coils oriented with magnetic moments perpendicular to the fracture plane) is not affected if the fracture is resistive, i.e., has a higher resistivity than the surrounding medium. This lack of sensitivity is due to the fact that the primary electric field generated by y'-transmitter (at 90° to the fracture plane) and secondary electric field inducing a magnetic field into y'-receiver are parallel to the fracture. It is well known that a thin resistive layer parallel to electric currents does not affect induction measurements.

If, on the other hand, the fracture is conductive, i.e., is has a higher conductivity than the surrounding medium, the $H_{x'x'}$ measurement is not affected by the fracture due to the fact that the primary and secondary electrical currents for this component are perpendicular to the fracture and when they cross it they are not changed by a very narrow conductive interval.

The multi-component induction tool of FIG. 2 acquires, among other component, $H_{xx}$, $H_{yy}$ and $H_{xy}$ components that are oriented at unknown angle $\varphi$ with respect to the fracture and corresponding coordinate system (x',y'). Below we illustrate how from measured $H_{xx}$, $H_{yy}$, and $H_{xy}$ components in the presence of a fracture we can determine the orientation of the fracture (angle $\varphi$) and consequently by using a rotation technique we can extract unaffected corresponding component $H_{x'x'}$ (for a conductive fracture) or $H_{y'y'}$ (for resistive fracture). This unaffected component then will be used in subsequent processing for resistivity anisotropy.

In the presence of fracture the measured $H_{xx}$, $H_{yy}$, and $H_{xy}$ components can be expressed through the principal components $H_{x'x'}$ and $H_{y'y'}$ using the known rotation equation, the same as eqn. (1):

$$\begin{pmatrix} H_{xx} \\ H_{yy} \\ H_{xy} \end{pmatrix} = \begin{pmatrix} \cos^2\varphi & \sin^2\varphi \\ \sin^2\varphi & \cos^2\varphi \\ -\cos\varphi\sin\varphi & \cos\varphi\sin\varphi \end{pmatrix} \begin{pmatrix} H_{x'x'} \\ H_{y'y'} \end{pmatrix}, \quad (4)$$

This relationship allows us immediately determine the angle $\varphi$:

$$\varphi = \frac{1}{2}\tan^{-1}\left[\frac{2H_{xy}}{H_{yy} - H_{xx}}\right]. \quad (5)$$

Consequently, we can calculate the principal components themselves:

$$H_{x'x'} = \frac{H_{xx}\cos^2\varphi - H_{yy}\sin^2\varphi}{\cos^2\varphi - \sin^2\varphi} \quad (6)$$

$$H_{y'y'} = \frac{H_{xx}\sin^2\varphi - H_{yy}\cos^2\varphi}{\sin^2\varphi - \cos^2\varphi}.$$

The principal components are in a plane transverse to the longitudinal axis of the tool. The two effects discussed above (eccentering and fracturing) are examples in which the response of the 3DEX tool is affected by the orientation of the tool. The correction given by eqns. (1)-(6) is referred to as an azimuthal correction. The azimuthal correction corrects for the effect of an azimuthal disturbance of the multi-component measurements by causes such as eccentering and fracturing.

Figure 5:
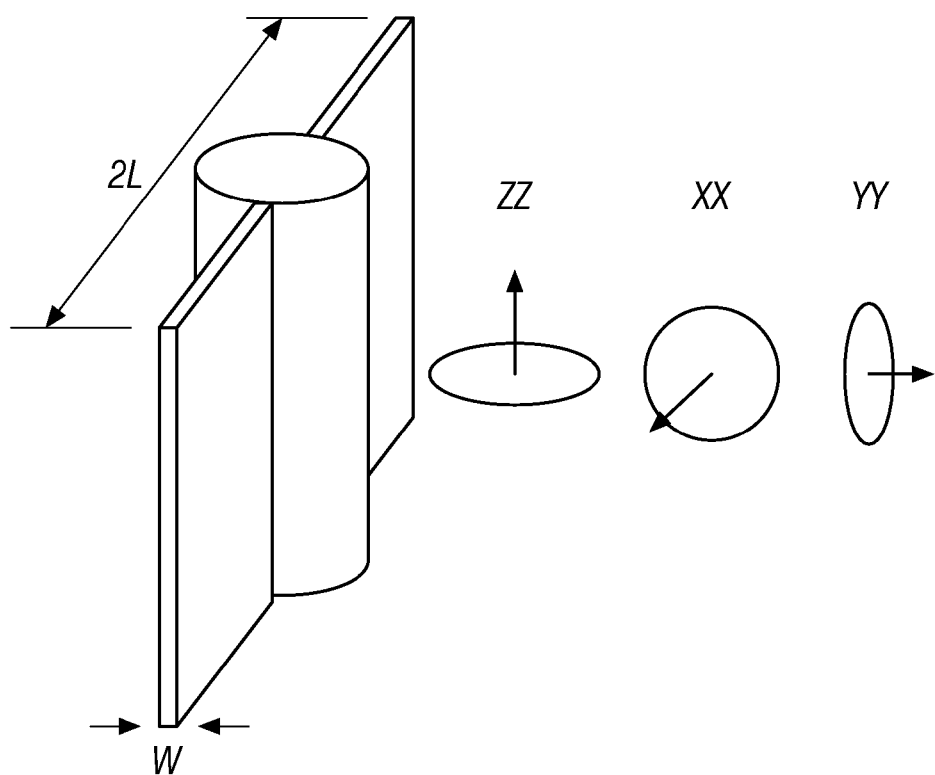
FIG. 5 illustrates a model used for simulating fractures in the subsurface.
Figure 6:
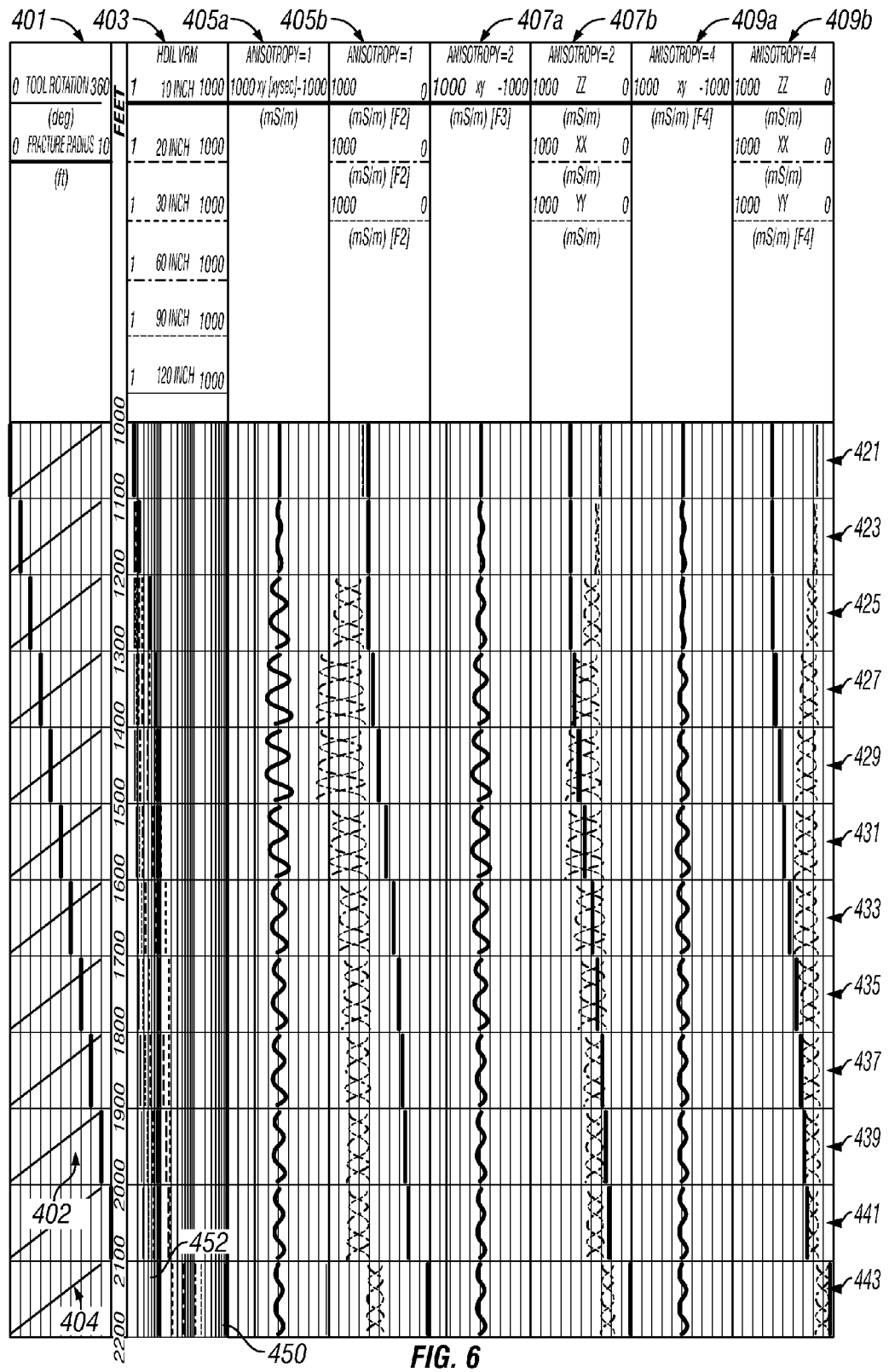
FIG. 6 illustrates simulation results for vertical resistive fractures of different length on HDIL and skin effect corrected (SEC) 3DEX measurements.

We next discuss the effect of a vertical fracture on the $H_{zz}$ component. FIG. 5 shows a model that was used for simulating the effect of a vertical fracture. A fracture of radial extend 2L and width W intersects a vertical wellbore. FIG. 6 depicts the results of numerical simulation for the High Definition Induction Log (HDIL), (focused curves) and 3DEX (skin-effect corrected) curves. The HDIL is an array induction tool with transmitter and receiver coils parallel to the tool axis. Presented are twelve different fracture radii—from 0 (no fracture) to 10 feet and infinite fracture (421, 423, 425, 427, 429, 431, 433, 435, 435, 437, 439, 441 and 443)—for 3 different vertical resistivities: with anisotropy ratios of 1, 2, and 4 (a total of 36 cases). The length of the fracture increases in the Z direction (presented in the track 401 by the discontinuous line 402). For each fracture radius 100 ft of data are generated where the tools rotate from 0 to 360 degrees. The tool rotation is depicted schematically by 404. The HDIL focused curves are in track 403. In the next three pairs of tracks (405a-405b), (407a-407b) and (409a-409b), we depict 3DEX SEC curves for three anisotropy values ($\lambda$=1, 2 and 4 with two tracks for each). The first track in each pair is the XY component while the second track in each pair shows the ZZ, XX and YY components.

Several observations may be made on this figure. It is seen that the HDIL response is similar to that of resistive invasion—shallow focused curves read higher resistivity than the deep ones. This behavior of the focused curves is easy to explain: a shallow resistive fracture is an obstacle for the shallow induced currents that contribute mostly to the short subarrays. Note that in the top interval 421 there is no visible separation between the different curves in track 403 that correspond to the different transmitter-receiver spacing in the HDIL, while at the largest fracture length (interval 443), the shallow curve 450 reads higher resistivities than the deep curve 452. The induced currents with a large radius (that mostly contribute to the deep curves) are not affected at all or affected very little by shallow fractures. It is noted that a 120 in. (3.048 m) depth of investigation curve does not change unless the length of the fracture becomes greater than 4 ft (1.219 m).

Figure 7A:
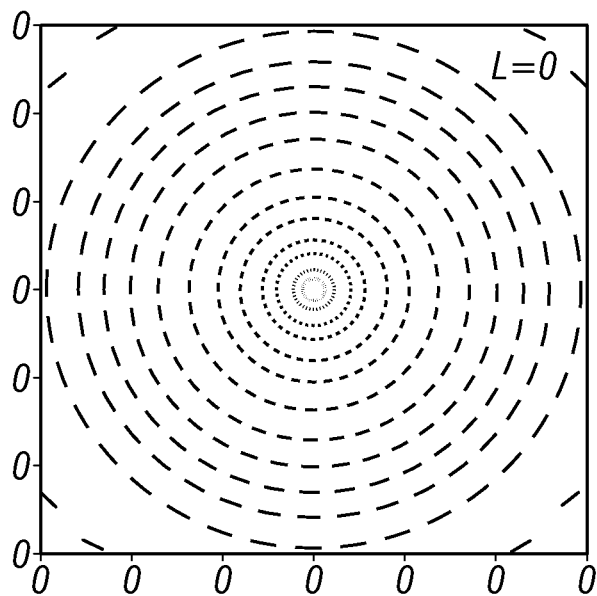
FIGS. 7a-7d show simulated current flows in a horizontal plane intersected by a vertical fracture.
Figure 7B:
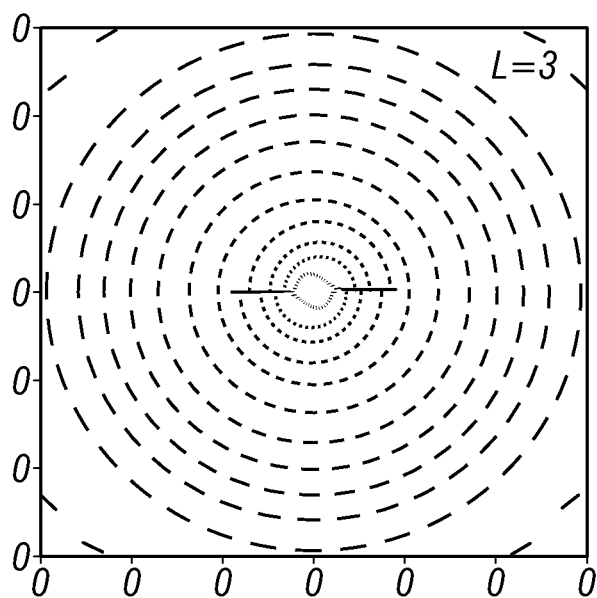
Figure 7C:
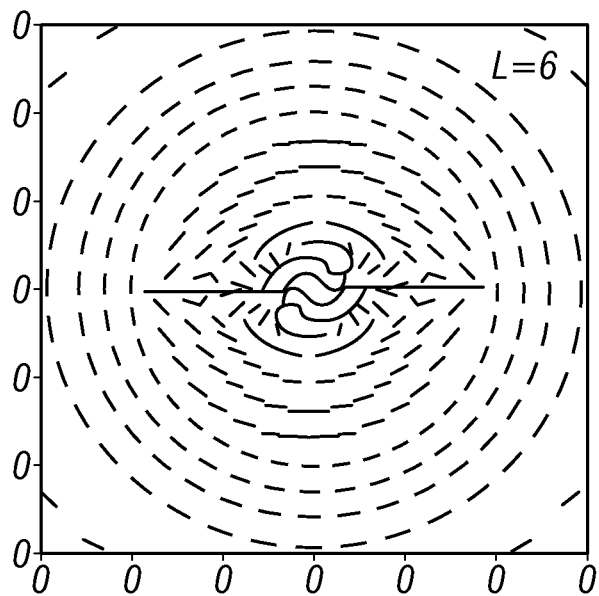
Figure 7D:
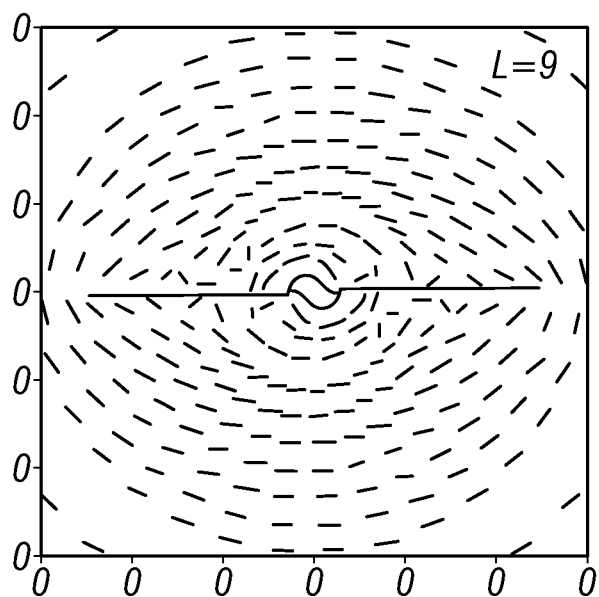

FIGS. 7a-7d show the simulated current flow in a horizontal plane for a coil with its axis parallel to the borehole. FIG. 7a is for L=0 and shows undisturbed current flowing around the borehole. FIG. 7d is for L=9 in (22.86 cm) and shows the significant disruption of current flow around the borehole. FIGS. 7b and 7c (which correspond to fracture radial extents of 3 in (0.076 m) and 6 in (1.52 m) respectively) show results that are intermediate to those in FIGS. 7a and 7d.

The modeling results above show that a multi-array induction tool such as the HDIL has a good sensitivity to the radial extent of a vertical resistivity fracture. A simple inversion algorithm has been developed for estimation of the radial extent of a fracture using the array induction data. At every depth, we have 6 measurements and 2 unknowns—the formation resistivity and the radial extent of the fracture. For simplicity, vertical variations in resistivity are not presently accounted for, though they could be. A look-up table of HDIL responses for different formation resistivities and different radial extent of the fractures enables the use of basic interpolation techniques to recover the formation resistivity and the radial extent of the fracture.

A table lookup can also be done for different formation resistivities for different borehole sizes and different mud conductivities. This enables the determination of the recovery of the formation resistivity using measurements made with an eccentered tool.

The use of $H_{zz}$ measurements in conjunction with various combinations of $H_{xx}$ and $H_{yy}$ measurements is discussed, for example, in U.S. Pat. No. 6,636,045 to Tabarovsky et al., having the same assignee as the present invention and the contents of which are incorporated herein by reference. In the present invention, once the corrected $H_{zz}$ measurement is obtained, then it is possible to estimate the horizontal and vertical formation resistivities using $H_{x'x'}$ or $H_{y'y'}$, or an average of $H_{x'x'}$ and $H_{y'y'}$ measurements as discussed above.

Figure 8:
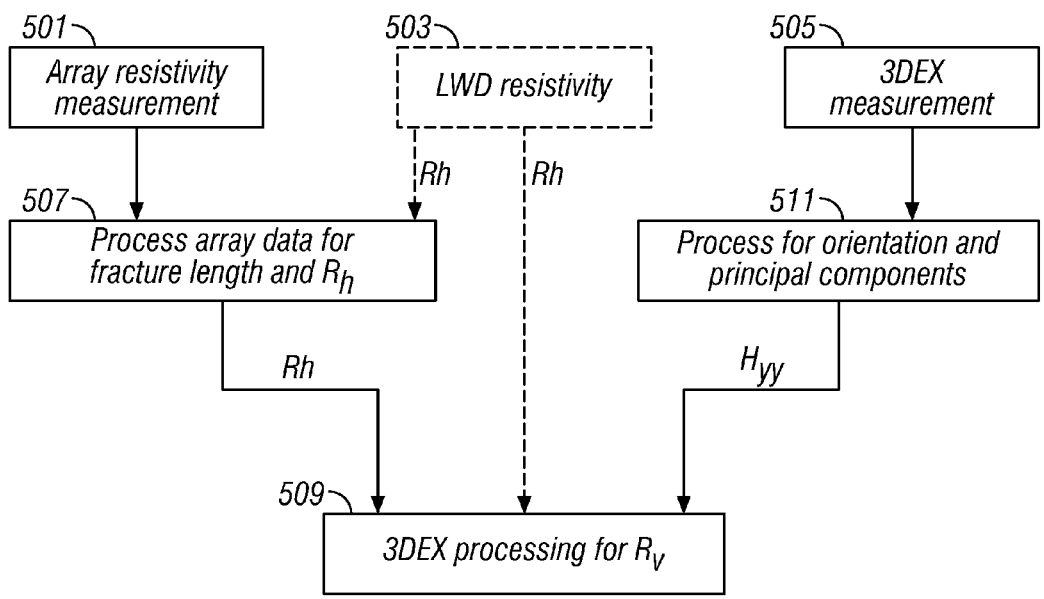
FIG. 8 is a flow chart illustrating different embodiments of the present invention.

FIG. 8 illustrates some of the possible embodiments of the invention. 3DEX measurements are obtained 505 where the measurements are affected by azimuthal variations. Examples of these azimuthal variations that have been discussed above include the effects of eccentering or the effect of a fracture. These measurements are processed to correct the orientation effects 511 as discussed above. In one embodiment of the invention, conventional LWD resistivity measurements are obtained 503. The conventional LWD measurements are used to estimate $R_h$, and as long as there are no pre-existing fractures in the earth formation, can be used in combination with the corrected measurement from 511 to estimate horizontal and vertical formation resistivity 509. As noted above, the corrected measurement may be $H_{x'x'}$ or $H_{y'y'}$, or an average of $H_{x'x'}$ and $H_{y'y'}$, and the estimation may be done using, for example, the method of Tabarovsky.

As an alternative to using LWD resistivity measurements for getting $R_h$, array resistivity measurements may be used 501. The array resistivity measurements may be inverted to determine the fracture length 507 (as discussed above) and get an estimate of $R_h$. Optionally, $R_h$ from LWD measurements may be used as part of the inversion 507. The estimate of $R_h$ from 507 may then be used in conjunction with the corrected measurement from 511 to get the horizontal and vertical resistivity of the formation 509.

Some or all of the processing may be done by a downhole processor, a processor at the surface, or a processor at a remote location. Implicit in the control and processing of the data is the use of a computer program on a suitable machine readable medium that enables the processor to perform the control and processing. The machine readable medium may include ROMs, EPROMs, EEPROMs, Flash Memories and Optical disks. The invention may also be implemented in conjunction with a measurement-while-drilling arrangement in which the multi-component and multi-array measurements are made using a suitable device on a bottomhole assembly conveyed on a drilling tubular such as a drillstring.

While the foregoing disclosure is directed to the preferred embodiments of the invention, various modifications will be apparent to those skilled in the art. It is intended that all variations within the scope of the appended claims be embraced by the foregoing disclosure.

What is claimed is:

1. A method of evaluating an earth formation, the method comprising:
   making a plurality of multi-component measurements using a logging tool in a borehole in the earth formation, the multi-component measurements indicative of a resistivity property of the earth formation, the multi-component measurements being affected by a disturbance in the azimuthal direction caused by an eccentering of the logging tool;
   estimating from the plurality of the multi-component measurements at least one principal component in a plane transverse to a longitudinal axis of the logging tool that is substantially unaffected by the disturbance, wherein estimating the at least one principal component further comprises performing a rotation of coordinates; and
   using the at least one principal component and a single frequency additional measurement indicative of a horizontal resistivity for estimating a horizontal resistivity ($R_h$) and a vertical resistivity ($R_v$).

2. The method of claim 1 further comprising obtaining the additional measurement using a resistivity logging tool conveyed on a bottomhole assembly into the borehole.

3. The method of claim 1 further comprising obtaining the additional measurement using an array resistivity tool conveyed in the borehole.

4. The method of claim 1 further comprising estimating an orientation of a fracture in the earth formation using the at least one principal component measurement.

5. The method of claim 1 further comprising estimating a magnitude and a direction of eccentering of the logging tool in the borehole.

6. An apparatus configured to evaluate an earth formation, the apparatus comprising:
   a logging tool configured to be conveyed in a borehole in the earth formation, the logging tool configured to make a plurality of multi-component measurements indicative of a resistivity property of the earth formation, the multi-component measurements being affected by a disturbance in the azimuthal direction caused by an eccentering of the logging tool; and
   a processor configured to:
      estimate-from the plurality of the multi-component measurements by performing a rotation of coordinates at least one principal component in a plane transverse to a longitudinal axis of the logging tool that is unaffected by the disturbance and
      use the at least one principal component and an additional single frequency measurement indicative of a horizontal resistivity for estimating a horizontal resistivity ($R_h$) and a vertical resistivity ($R_v$).

7. The apparatus of claim 6 further comprising a resistivity logging tool configured to be conveyed on a bottomhole assembly into the borehole and provide the additional resistivity measurement.

8. The apparatus of claim 6 further comprising an array resistivity tool configured to be conveyed in the borehole and provide the additional measurement.

9. The apparatus of claim 6 wherein the processor is further configured to estimate a fracture length using the additional measurement.

10. The apparatus of claim 6 wherein the processor is further configured to estimate an orientation of a fracture in the earth formation using the at least one principal component measurement.

11. The apparatus of claim 6 wherein the processor is further configured to estimate a magnitude and a direction of eccentering of the logging tool in the borehole.

12. A non-transitory computer-readable medium product having stored thereon instructions that when read by a processor cause the processor to execute a method, the method comprising:
   estimating, using a plurality of multi-component measurements indicative of a resistivity property of the earth formation, and a single-frequency measurement indicative of a horizontal property of the earth formation made by a logging tool in a borehole, the multi-component measurements being affected by a disturbance in the azimuthal direction caused by an eccentering of the logging tool, and by performing a rotation of coordinates, at least one principal component in a plane transverse to a longitudinal axis of the logging tool that is unaffected by the disturbance.

13. The non-transitory computer-readable medium of claim 12 further comprising at least one of (i) a ROM, (ii) an EPROM, (iii) and EEPROM, (iv) a flash memory, and (v) an optical disk.

* * * * *